Oct. 23, 1928.    C. METREWITZ    1,688,732
WASHING MACHINE
Filed Nov. 6, 1926
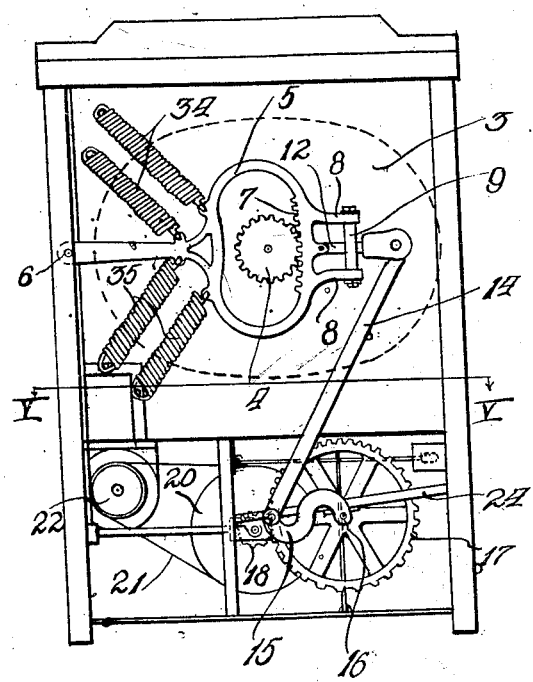
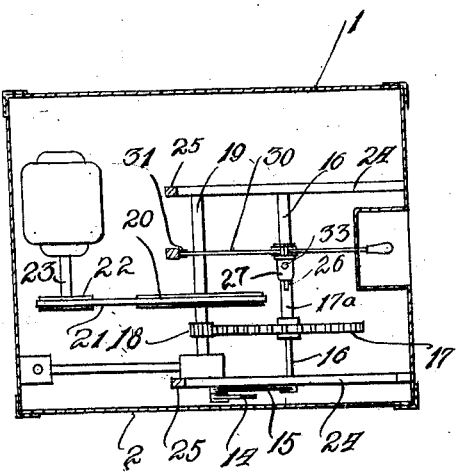
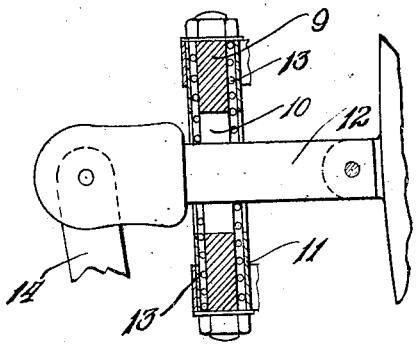
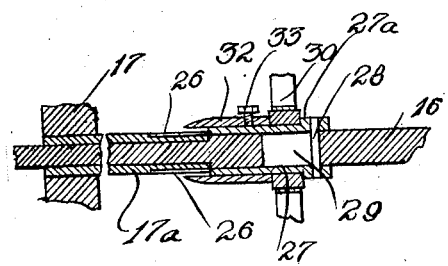
Inventor
Charles Metrewitz
By Attys Patented Oct. 23, 1928.

1,688,732

UNITED STATES PATENT OFFICE.

CHARLES METREWITZ, OF CHICAGO, ILLINOIS.

WASHING MACHINE.

Application filed November 6, 1926. Serial No. 146,589.

This invention relates to a washing machine of the oscillating type and concerns itself primarily with means for absorbing the shock during the oscillation thereof.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views, Figure 1 is an elevational view of the washing machine within the cabinet with one side of such cabinet removed.

Figure 2 is a sectional view taken substantially upon the line V—V of Figure 1.

Figure 3 is an enlarged sectional view through the yielding drive of the washing machine.

Figure 4 is a longitudinal sectional view through the driving shaft showing the manner of clutching the main driving gear to the shaft.

The washtub 3 is illustrated in dotted lines in Figure 1. It is suitably supported within the cabinet and has a gear 4 coaxially secured on one end thereof. A yoke rack 5 which is pivoted at 6 to a side of the cabinet, is provided with a row of teeth 7 within its loop for engaging the gear 4. From the side opposite the attaching portion of this yoke rack are a pair of spaced arms 8, which are connected by a bolt 9 having a slot 10 (Figure 3). A cylindrical casing 11 surrounds the bolt in spaced relation therefrom. This cylindrical casing is provided with a slot registering with the aforementioned slot 10 in the bolt. An operating lever 12 is pivoted to the yoke rack at a point between said arms and the same extends through the slots in the cylindrical housing 11 and bolt 9. A coil spring 13 surrounds the upper end of the bolt 9 within the casing 11 and bears upon the upper edge of the lever 12. A coil spring 13 surrounds the lower portion of the bolt 9 within the casing 11 and normally bears against the lower edge of the lever 12. The outer end of the lever 12 is connected to a pitman 14, the lower end of which pitman is connected to a goose neck crank 15 secured upon a shaft 16. A gear wheel 17 is loosely journaled upon the shaft 16 and meshes with the pinion 18 rigidly secured upon a shaft 19. A pulley 20 is fastened upon the shaft 19 and is geared by a belt 21 to a pulley 22 upon a motor shaft 23. The shafts 16 and 19 are journaled in suitable bearings formed upon frame members 24 which extend from the ends of the cabinet to vertical standards 25 within the cabinet.

In order to connect the gear 17 with its shaft 16 the former is provided with an elongated hub 17$^a$ provided with grooves 26 upon diametrically opposite sides, which are adapted to be engaged by a slidable clutch member 27 upon the shaft 16. The clutch member 27 is slidably attached to the shaft by means of a pin 28 extending through a slot 29 in the shaft. A form of yoke lever 30 pivoted at 31 and provided with a bearing encircling the clutch member 27 is adapted to shift said clutch member in engagement with the gear. The lever 30 which is in the form of a shipper lever is confined by the shoulder 27$^a$ on the slidable clutch member 27 and a sleeve member 32 adjustably secured in opposed relation to the shoulder by means of a set screw 33.

A pair of coiled springs 34 are connected to the upper portion of the yoke rack 5 and are anchored to the ends of the casing. A pair of similar springs 35 are connected to the lower portion of the yoke rack and are attached to the end of the cabinet. The upper springs will tend to elevate the yoke rack when it is pulled downwardly and the lower spring will tend to pull the yoke rack downwardly when it is elevated.

In the operation of the device, the shipper lever 30 is operated to clutch the gear 17 and the shaft 16. The motor is then started for rotating the gear and shaft 16 through the instrumentality of the belt gearing 21 and the pinion 18. As the shaft 16 revolves the pitman 14 will be reciprocated and oscillate the yoke rack 5 for oscillating the washtub. It will be noted that during this operation the lever 12 will alternately compress the springs 13 whereby a yieldable cushion is provided between the lever 12 and the yoke rack. Consequently there will be little tendency for the yoke rack to strip the gear 4 during the operation, as frequently happens in present constructions.

I am aware that many changes may be made and numerous details of the construction varied through a wide range without departing from the principles of this invention, and I therefore do not purpose limiting the patent granted hereon, otherwise than necessitated by the prior art.

I claim as my invention:

1. In a washing machine, a tub, a gear secured coaxially on said tub, a rack for oscillating said gear, a pair of arms on said rack, a slotted member connecting said arms, driving mechanism including a link extending through said slot and pivoted to said rack and a pair of opposed springs carried by said slotted member for acting upon opposite edges of said link.

2. In a washing machine, a tub, a gear secured coaxially on said tub, a rack for oscillating said gear, resilient means engaging said tub and said rack at points above and below the median line of said rack, a pair of arms on said rack, a slotted member connecting said arms, driving mechanism including a link extending through said slot and pivoted to said rack and a pair of opposed springs carried by said slotted member for acting upon opposite edges of said link.

In testimony whereof I have hereunto subscribed my name.

CHARLES METREWITZ.